(12) United States Patent
Long

(10) Patent No.: US 8,539,041 B2
(45) Date of Patent: Sep. 17, 2013

(54) METHOD, APPARATUS, AND NETWORK SYSTEM FOR ACQUIRING CONTENT

(71) Applicant: Huawei Technologies Co., Ltd., Guangdong (CN)

(72) Inventor: Youshui Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/625,448

(22) Filed: Sep. 24, 2012

(65) Prior Publication Data

US 2013/0166680 A1    Jun. 27, 2013

Related U.S. Application Data

(63) Continuation of application No. PCT/CN2012/075775, filed on May 19, 2012.

(30) Foreign Application Priority Data

Dec. 23, 2011    (CN) .......................... 2011 1 0437436

(51) Int. Cl.
G06F 15/16    (2006.01)

(52) U.S. Cl.
USPC ....................................................... 709/217

(58) Field of Classification Search
None
See application file for complete search history.

(56) References Cited

U.S. PATENT DOCUMENTS

| | | | |
|---|---|---|---|
| 2008/0155059 A1* | 6/2008 | Hardin et al. ................. | 709/218 |
| 2009/0037960 A1* | 2/2009 | Melby .............................. | 725/87 |
| 2010/0306339 A1 | 12/2010 | Ling et al. | |
| 2011/0131298 A1* | 6/2011 | Courtemanche et al. ..... | 709/219 |
| 2011/0191449 A1* | 8/2011 | Swildens et al. ............. | 709/219 |
| 2012/0323987 A1* | 12/2012 | Cantu et al. ................... | 709/201 |
| 2012/0331229 A1* | 12/2012 | Sabir ............................ | 711/118 |

FOREIGN PATENT DOCUMENTS

| | | |
|---|---|---|
| CN | 1956448 A | 5/2007 |
| CN | 101668177 A | 3/2010 |
| CN | 101902346 A | 12/2010 |
| CN | 102137157 A | 7/2011 |

OTHER PUBLICATIONS

Search report&Written Opinion issued in corresponding PCT application No. PCT/CN2012/075775, dated Apr. 10, 2012, total 20 pages.

* cited by examiner

*Primary Examiner* — Ryan Jakovac

(57) ABSTRACT

Embodiments of the present invention disclose a method for acquiring content, where the method includes: acquiring a content request from a client; determining the number of times for requesting requested content; and when the number of times for requesting is greater than a first preset threshold, acquiring the content from a content routing node group in a content network according to the content request, where the content routing node group has a content storage function, and sending the acquired content to the client. The embodiments of the present invention further disclose an apparatus and a network system to which the method is applied. By using the embodiments of the present invention, network transmission redundancy can be reduced, a response speed of user access can be increased, and user experience can be improved.

14 Claims, 7 Drawing Sheets

US 8,539,041 B2

METHOD, APPARATUS, AND NETWORK SYSTEM FOR ACQUIRING CONTENT

CROSS-REFERENCE TO RELATED APPLICATIONS

This application is a continuation of International Application No. PCT/CN2012/075775, filed on May 19, 2012, which claims priority to Chinese Patent Application No. 201110437436.3, filed on Dec. 23, 2011, both of which are hereby incorporated by reference in their entireties.

FIELD OF THE INVENTION

Embodiments of the present invention relate to the field of Internet technologies, and in particular to a method, an apparatus, and a network system for acquiring content.

BACKGROUND OF THE INVENTION

With the continuous increase of a network scale and a user demand, bandwidths for content transmission in the Internet become more and more. For example, a content sharing service in the WWW (World Wide Web, world wide web) or a P2P (Point to Point, point to point) network occupies most of network bandwidths. The content sharing service occupies most of the network bandwidths due to massive repetitive (redundant) transmission of the same information, thereby causing a waste of a bandwidth resource.

In a content network, serving nodes are deployed in the Internet, and these serving nodes are organized through an application layer protocol to form an overlay layer constructed above an IP network, so as to provide a flexible and efficient service for a network application. A typical application of the content network includes a content delivery network (Content Delivery Network, CDN). The CDN adopts a hierarchical (hierarchy) naming manner to improve the efficiency of content organization and query. Specifically, the "name" of content replaces an IP address to redesign a format of a data packet and a protocol of each layer, and routing information and content requested by a user are both stored in a router. A storage capability of the router is utilized to a certain extent in this way.

In the content network in the prior art, the router relocates user requests without discrimination to an edge content server, which causes that massive content transmission redundancy between the router and the content server, so that a network load is heavy and a response speed of user access is relatively low.

SUMMARY OF THE INVENTION

Embodiments of the present invention provide a method, an apparatus, and a network system for acquiring content, which can reduce content transmission redundancy between a router and a content server, thereby reducing a network load, increasing a response speed of user access, and improving user experience.

An embodiment of the present invention discloses a method for acquiring content, where the method includes: acquiring a content request from a client; determining the number of times for requesting requested content; and when the number of times for requesting is greater than a first preset threshold, acquiring the content from a content routing node group in a content network according to the content request, where the content routing node group has a content storage function, and sending the acquired content to the client.

An embodiment of the present invention further discloses a content routing node, including: a content request acquiring unit, configured to acquire a content request from a client; a unit for determining the number of times for requesting, configured to determine the number of times for requesting content requested by the content request, where the content request is acquired by the content request acquiring unit; a first selection unit, configured to, when the number of times for requesting determined by the unit for determining the number of times for requesting is greater than a first preset threshold, acquire the content from a content routing node group in a content network according to the content request, where the content routing node group has a content storage function; and a content sending unit, configured to send the content acquired by the first selection unit to the client.

An embodiment of the present invention further discloses a network system, including a client and a content routing node group, where the client is configured to send a content request to a content routing node; and the content routing node in the content routing node group is configured to acquire the content request from the client, determine the number of times for requesting requested content; when the number of times for requesting is greater than a first preset threshold, acquire the content from the content routing node group in a content network according to the content request, where the content routing node group has a content storage function; and send the acquired content to the client.

With the method, the apparatus, and the network system according to the embodiments of the present invention, the content request from the client is acquired, the number of times for requesting the requested content is determined, and when the number of times for requesting is greater than the first preset threshold, the content is acquired from the content routing node group in the content network according to the content request, where the content routing node group has the content storage function, and the acquired content is sent to the client, which can reduce content transmission redundancy between a router and a content server, thereby reducing a network load, increasing a response speed of user access, and improving user experience.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

Figure 1:
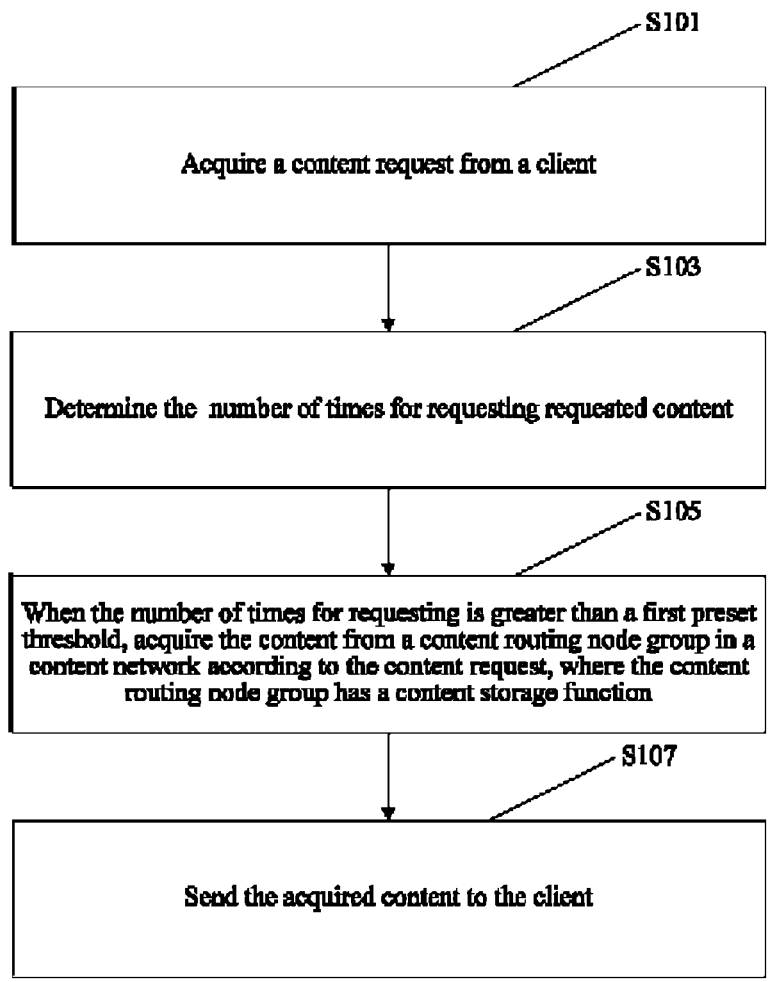
FIG. 1 is a schematic diagram of a method embodiment according to an embodiment of the present invention.

In order to make the objectives, technical solutions, and advantages of the embodiments of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative efforts shall fall within the protection scope of the present invention.

In a content network, serving nodes are deployed in the Internet, and these serving nodes are organized through an application layer protocol to form an overlay layer based on an IP network, so as to provide a flexible and efficient service for a network application. Its typical application includes a network (Content Delivery Network, CDN), a peer to peer (Peer to Peer, P2P) network, and Cloud Computing that utilize the content network to provide a service for a user, which can improve network flexibility, improve user service experience, and reduce a traffic pressure of a backbone network. The CDN reorients a user access request to a cache (cache) server of the CDN through an intelligent DNS (domain name system). If data requested by a user is stored in the cache, the data is directly obtained; and if the data is not stored in the cache, the cache obtains a source address of the data through parsing of an internal DNS of the CDN. The cache captures the data from the source address of the data, stores a copy of the data on the cache, and then sends a copy of the data to the user. However, the DNS cannot recognize which requests are redundant requests, and therefore, the DNS relocates user requests without discrimination to an edge server, which causes that storage efficiency of the cache is low and a processing load of the cache server is increased. Moreover, because no content is shared between the CDN and the cache, less popular content is stored redundantly, so that a stored resource cannot be effectively utilized.

In the embodiments of the present invention, it is considered that popular content is requested for many times but the amount of the popular content is small, whereas less popular content is requested for a few times but the amount of the less popular content is large, in an IP network, massive redundant transmission can be reduced as long as special processing is applied on popular content that has a small quantity. A content routing node group may be a group formed by multiple content routing nodes with a content storage function through a content routing protocol, so as to implement content sharing inside the group. Each content routing node still reserve an original IP routing function, so that popular content is acquired from the content routing node group in the content network, whereas less popular content, when requested, is still acquired by routing to a content server. In this way, a high cost in arranging more servers may be saved, and system improvement is not too difficult. The content routing nodes are connected through a virtual link established in the IP network (which is accomplished through a content routing protocol), so as to reorient a request for popular content to a content routing node group that stores the content in the content network, and reorients a request for less popular content to, for example, a content server in the IP network.

With the method, the apparatus, and the network system according to the embodiments of the present invention, network transmission redundancy can be reduced, a response speed of user access can be improved, and user experience can be improved.

An embodiment of the present invention provides a method for acquiring content. FIG. 1 is a schematic diagram of a method embodiment according to an embodiment of the present invention, where the method includes:

S101: Acquire a content request from a client.

A user client sends a connection request to a destination content server address, a content routing node has detected the connection request and records connection information, the user client sends a content request by using an established connection, and the content routing node has detected content request information of the connection and records the content request information. At this time, the content routing node has already acquired the content request from the client.

The content request message includes a content name, where the content name is an attribute identifier for distinguishing specific content, and is similar to a URL identifier, and the content name may be information that may be used for identifying content, such as the name of requested content.

S103: Determine the number of times for requesting the requested content.

This step includes: when the request is an initial request for a content routing node group, initializing the number of times for requesting to 1; and when the request is not an initial request for the content routing node group, acquiring the historical number of times for requesting from the content routing node group, and adding 1 to the historical number of times for requesting to obtain the number of times for requesting; or when the request is an initial request for the content routing node group, acquiring the historical number of times for requesting the requested content from the content server, and adding 1 to the historical number of times for requesting to obtain the number of times for requesting; and when the request is not an initial request for the content routing node group, acquiring the historical number of times for requesting from the content routing node group, and adding 1 to the historical number of times for requesting to obtain the number of times for requesting.

That is, when a request for certain content is initially acquired, the number of times for requesting the content is initialized, recorded, and stored; and when a request for the same content is subsequently acquired, the historical number of times for requesting the content is directly acquired from a content routing table, and 1 is added to the historical number of times for requesting to obtain the number of times for requesting.

After this step is executed, optionally, the number of times for requesting may further be sent to another content routing node in the content routing node group, so that the another content routing node updates the number of times for requesting.

S105: When the number of times for requesting is greater than or equal to a preset threshold, acquire the content from a content routing node group in a content network according to the content request, where the content routing node group has a content storage function.

After the content is acquired, the method further includes: storing the acquired content in the content routing node group, and the content routing node includes a local content routing node that receives the content request and another content routing node.

In practice, to implement a content-based routing network architecture, two new protocols need to be added to the current Internet: (1) an Internet name resolution protocol (INRP, Internet name resolution protocol), where content is converted into an address according to routing information maintained by a relay node; (2) a name-based routing protocol (NBRP, name-based routing protocol), which is similar to a border gateway protocol, where routing information on a relay node is dynamically updated. A current content network adopts this content-based routing manner.

Specifically, when the number of times for requesting the requested content is determined, the number of times for requesting is compared with a first preset threshold. When the number of times for requesting is greater than or equal to the preset threshold, the content is acquired from the content routing node group in the content network according to the content request, where the content routing node group has a content storage function, and the content network includes a content routing node with a content storage function, where the content routing node with the content storage function includes a local content routing node and another content routing node, and the content routing node stores the content, the name of the content, and the number of times for requesting the content.

Specifically, the content routing node records requested content acquired by all content routing nodes in a content routing table, and entries of a local content routing table include the name of requested content, the number of times for requesting requested content, interface information, a next hop address, and the content data. Construction of the content routing table is shown in Table 1. In the content routing table, routing information that another content routing node may request the content is recorded, so as to implement content routing inside content routing node groups that have a content storage function. A structure of the content routing table is similar to that of an IP content routing table, where entry content includes: a content name, the number of times for requesting, interface information, a next hop address, a storage status, and so on. At the time of searching for a route, according to the content name, a prefix of a longest content name is used to match a content route item to obtain interface information, and a request is forwarded to these matched interfaces. For example, if the name of requested content acquired by the content routing node from a received content request is content 1 and the historical number of times for requesting corresponding to content 1 is 100, 1 is added to 100 to update a value of the number of times for requesting to 101. It is assumed that the first preset threshold at this time is 301, after being acquired, content 1 is not stored in the content routing node, and the interface information, the next hop address, and the content data are all empty. Likewise, if the name of the requested content acquired by the content routing node from the received content request is content 2, and the historical number of times for requesting corresponding to content 2 is 200, 1 is added to 200 to update a value of the number of times for requesting to 201. It is assumed that the first preset threshold at this time is 301, after being acquired, content 2 is not stored in the content routing node either, and the interface information, the next hop address and the content data are all empty. If the name of the requested content acquired by the content routing node from the received content request is content 3, and the number of times for requesting corresponding to content 3 is 300, it is assumed that the first preset threshold at this time is 301, 1 is added to 300 to update a value of the number of times for requesting to 301, which is equal to the first preset threshold. At this time, after being acquired, content 3 is stored in the content routing node, the content data is cccccccccccccc, while the interface information and the next hop address are both empty. Meanwhile, another content routing node calculates a routing path (the interface information, the next hop address, and so on) for routing to the content routing node that stores the content, and modify the interface information and the next hop address to corresponding values, but the content data is empty, as shown in table 2. For example, for another certain content routing node, interface information of the content routing node that stores the content is 1 and a next hop address is 3.4.5.6. In the content routing table, an entry of the content data is empty, and only the content name, the number of times for requesting, the interface information, and the next hop address exist. Subsequently, when a certain content routing node receives a request whose name is content 3 again, the corresponding number of times for requesting is obtained by adding 1 to 301, which is greater than the first preset threshold 301. If the content is stored in the content routing node that receives the request, corresponding content is directly acquired according to the name. If the content is stored in another content routing node, a request is sent, according to the name, the interface information, and the next hop address in the content routing table, to a routing node that stores the content, so as to acquire the content.

TABLE 1

| Content Name | The Number of Times for Requesting | Interface Information | Next Hop Address | Content Data |
|---|---|---|---|---|
| Content 1 | Accessed for 100 times | Empty | Empty | Empty |
| Content 2 | Accessed for 200 times | Empty | Empty | Empty |
| Content 3 | Accessed for 300 times | Empty | Empty | ccccccc |

TABLE 2

| Content Name | The Number of Times for Requesting | Interface Information | Next Hop Address | Content Data |
|---|---|---|---|---|
| Content 1 | Accessed for 100 times | Empty | Empty | Empty |
| Content 2 | Accessed for 200 times | Empty | Empty | Empty |
| Content 3 | Accessed for 300 times | 1 | 3.4.5.6 | ccccccc |

As described in the foregoing, the content routing node searches, according to a content name of a requested content, in the local content routing table, to determine whether the requested content exists, and when the content is found in the local content routing table, the content and its corresponding number of times for requesting are locally acquired. However, when the stored content cannot be locally found, but it is found that another content routing node stores the content, a request for the content is forwarded, so as to acquire the content from the another content routing node in the content network. A forwarding process of an intermediate content routing node includes: receiving a data packet of the content from one network interface, and forwarding the data packet through another network interface after path selection. The data packet is transmitted through several routers, and finally reaches another content routing node that stores the content and is on the content network. Afterwards, another content routing node returns the content to a requesting content routing node in the same way.

If the name of the content cannot be found in the content routing table, the name of the content is newly added in the content routing table and its corresponding number of times for requesting is initialized to 1; or the historical number of times for requesting the requested content is acquired from the content server, and 1 is added to the historical number of times for requesting to obtain the initialized number of times for requesting. Moreover, the number of times for requesting and the content name are sent to another content routing node in the content routing node group, so that the another content routing node updates the number of times for requesting and the content name. At this time, the content has not been stored in the content routing node group, and therefore, the content data, the interface information, and the next hop address may be empty. A specific method that another content routing node updates the number of times for requesting and the content name is adding the content name and the number of times for requesting in the content routing table. When the number of times for requesting the content is less than the first preset threshold, the content request is normally forwarded according to the IP routing table. If the number of times for requesting the content is equal to the first preset threshold, the content routing node stores the acquired content in the content routing node group. Specifically, that the content routing node stores the acquired content in the content routing node group includes: when local remaining storage capacity is greater than or equal to a storage space required for storing the content, storing the content locally; and when the local remaining storage capacity is less than the storage space required for storing the content, determining, from the content routing node group, one content routing node whose current remaining storage capacity is greater than or equal to the storage space required for storing the content, and storing the content in the content routing node. When multiple other content routing nodes whose remaining storage capacity is greater than or equal to the storage space required for storing the content exist, one content routing node may be randomly determined for storing, or a routing node with the minimum number of hops from a local routing node may also be selected for storing. If multiple content routing nodes that have the minimum number of hops also exist, one content routing node is randomly determined for storing. When the content is stored in a certain content routing node, the content routing node establishes a content name, the number of times for requesting, and content data in a local content routing table, and sends an update request to another content routing node, so that the another content routing node updates, in its content routing table, the content name, the number of times for requesting, interface information for routing to a content routing node that stores the content, and a next hop address for routing to the content routing node that stores the content.

In addition, one IP routing table is stored on each content routing node, and construction of the IP routing table is the same as that in an existing IP router.

It should be noted that, when the number of times for requesting is greater than the first preset threshold, the acquiring the content from the content routing node group in the content network according to the content request, where the content routing node group has the storage function, includes: locally searching and determining whether the content is stored, and when the content is locally found, locally acquiring the content; and when the content cannot be locally found, acquiring the content from another content routing node in the content network. The foregoing steps are details of step S105 and are not limited in this embodiment, and may also be applied to other embodiments of the present invention.

The first preset threshold may be set as required. The first preset threshold may be set correspondingly according to the size of storage capacity of the content routing node. When the storage capacity of the content routing node is relatively large, the first preset threshold may be set relatively high; and when the storage capacity of the content routing node is relatively small, the first preset threshold may be set relatively low.

S107: Send the acquired content to the client.

As a supplement to the method embodiment, when step S103 has been executed, that is, after the number of times for requesting the requested content is determined, optionally, the method may further include: when the number of times for requesting is less than or equal to the first preset threshold, sending the content request to a content server that stores the content to acquire the content, and sending the acquired content to the client.

It should be noted that, an executor of this step may be a general-purpose processor or a dedicated processor.

In this embodiment of the present invention, the number of times for requesting the content is determined according to the content request from the client. When the number of times for requesting is greater than the first preset threshold, the content is acquired from the content routing node group in the content network according to the content request, where the content routing node group has the content storage function; and when the number of times for requesting is less than or equal to the first preset threshold, the content request is sent to the content server that stores the content to acquire the content. Therefore, traffic distribution is well implemented, which can improve content acquiring efficiency and reduce a repeated transmission rate of a data packet.

Figure 2:
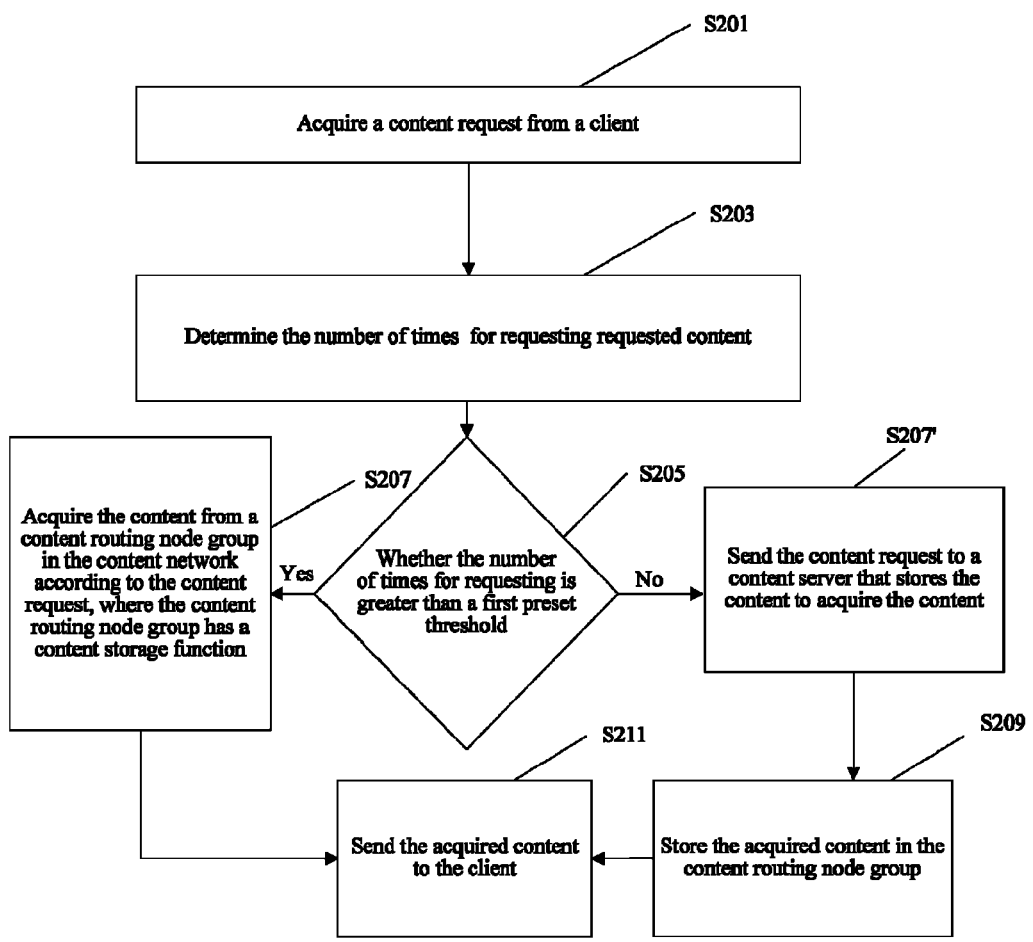
FIG. 2 is a schematic diagram of another method embodiment according to an embodiment of the present invention.

FIG. 2 illustrates step S103 in the method embodiment shown in FIG. 1, and is a flow chart of determining the number of times for requesting the requested content. After a content request from a client is acquired, as shown in the figure, the step of determining the number of times for requesting the requested content specifically includes:

S201: Acquire a content request from a client.

S203: Determine the number of times for requesting requested content.

This step includes: judging whether the request is an initial request for a content routing node group, and when the request is an initial request for the content routing node group, initializing the number of times for requesting to 1; and when the request is not an initial request for the content routing node group, acquiring the historical number of times for requesting from the content routing node group, and adding 1 to the historical number of times for requesting to obtain the number of times for requesting; or when the request is an initial request for the content routing node group, acquiring the historical number of times for requesting the requested content from a content server, and adding 1 to the historical number of times for requesting to obtain the number of times for requesting; and when the request is not an initial request for the content routing node group, acquiring the historical number of times for requesting from the content routing node group, and adding 1 to the historical number of times for requesting to obtain the number of times for requesting.

Specifically, a method for judging whether the request is an initial request for the content routing node group is: searching, by a content routing node, a local content routing table for the content and its corresponding number of times for requesting according to a content name of the requested content, if the content and its corresponding number of times for requesting cannot be found, judging that the request is an initial request for the content routing node group, and initializing the number of times for requesting to 1, or acquiring the historical number of times for requesting the requested content from the content server, and adding 1 to the historical number of times for requesting to obtain the initialized number of times for requesting. The initializing the number of times for requesting to 1, or the acquiring the historical number of times for requesting the requested content from the content server, and adding 1 to the historical number of times for requesting to obtain the initialized number of times for requesting are two parallel solutions, either of which may be executed. If it is selected that the content routing node initializes the number of times for requesting to 1, the existing historical number of times for requesting the content in the content server may not be considered, but reference is made to a statistical result of the content routing node group. If it is selected that the historical number of times for requesting is acquired from the content server, the existing historical number of times for requesting needs to be considered in the statistical result as reference, and with the foregoing method, popularity of the content in a local area may be distinguished from global popularity of the content.

Further, when the request is not an initial request for the content routing node group, the acquiring the historical number of times for requesting the requested content, and adding 1 to the historical number of times for requesting to obtain the times for requesting include: if the content routing node searches, according to the content name of the requested content, the local content routing table and finds the content and its corresponding number of times for requesting, acquiring the historical number of times for requesting the requested content from the local content routing table, and adding 1 to the historical number of times for requesting to obtain the number of times for requesting.

S205: Determine whether the number of times for requesting is greater than a first preset threshold, that is, compare the number of times for requesting with the first preset threshold, where the first preset threshold may be determined according to an actual requirement and may be, for example, 1, and in such a case, as long as the content is requested more than once, the content may be acquired from a content network.

S207: Acquire the content from a content routing node group in the content network according to the content request, where the content routing node group has a content storage function.

S207': Send the content request to a content server that stores the content to acquire the content.

S209: Store the acquired content in the content routing node group.

This step specifically includes: first, detecting local remaining storage capacity, and comparing a detection result with a storage space required for storing the content; when the local remaining storage capacity is greater than or equal to the storage space required for storing the content, locally storing the content; and when the local remaining storage capacity is less than the storage space required for storing the content, determining, from the content routing node group, one content routing node whose current remaining storage capacity is greater than or equal to the storage space required for storing the content, and storing the content in the content routing node. When the content is stored in a certain content routing node, the content routing node establishes a content name, the number of times for requesting, and content data in a local content routing table, and sends an update request to another content routing node, so that the another content routing node updates, in its corresponding content routing table, the content name, the number of times for requesting, interface information for routing to a content routing node that stores the content, and a next hop address for routing to the content routing node that stores the content.

After the storing the acquired content in the content routing node group, this step may further include: when a storage time length of the content reaches a first preset life cycle and the number of times for requesting the content is less than a second preset threshold, deleting the content; and when the storage time length reaches the first preset life cycle and the number of times for requesting the content is not less than the second preset threshold, resetting the storage time length for recalculation; or, when the storage time length of the content reaches a second preset life cycle and the number of times for requesting the content is less than a third preset threshold, deleting the content; and when the storage time length reaches the second preset life cycle and the number of times for requesting the content is not less than the third preset threshold, resetting both the storage time length and the number of times for requesting for recalculation.

S211: Send the acquired content to the client.

It should be noted that, the two steps S209 and step S211 are not performed in a specific sequence. The acquired content may be sent to the client first, and then the acquired content is stored in the content routing node group; or the acquired content may be stored in the content routing node group first, and then the acquired content is sent to the client.

It should be noted that, steps S207 and S207' are two branches of one option, either of which may be selected, but which cannot be performed at the same time.

As a supplement to the method embodiment, after step S203 has been executed, that is, after the number of times for requesting the requested content is determined, optionally, the method may further include: when the number of times for requesting is less than or equal to the first preset threshold, sending the content request to a content server that stores the content to acquire the content, and sending the acquired content to the client.

In this embodiment of the present invention, the number of times for requesting the content is determined according to the content request from the client. When the number of times for requesting is greater than the first preset threshold, the content is acquired from the content routing node group in the content network according to the content request, where the content routing node group has the content storage function; when the number of times for requesting is less than or equal to the first preset threshold, the content request is sent to the content server that stores the content to acquire the content; and when the number of times for requesting is equal to the preset threshold, the content acquired from the content server that stores the content is locally stored, so that the content can be more conveniently accessed subsequently, thereby improving content acquiring efficiency and reducing a repeated transmission rate of a data packet.

Figure 3:
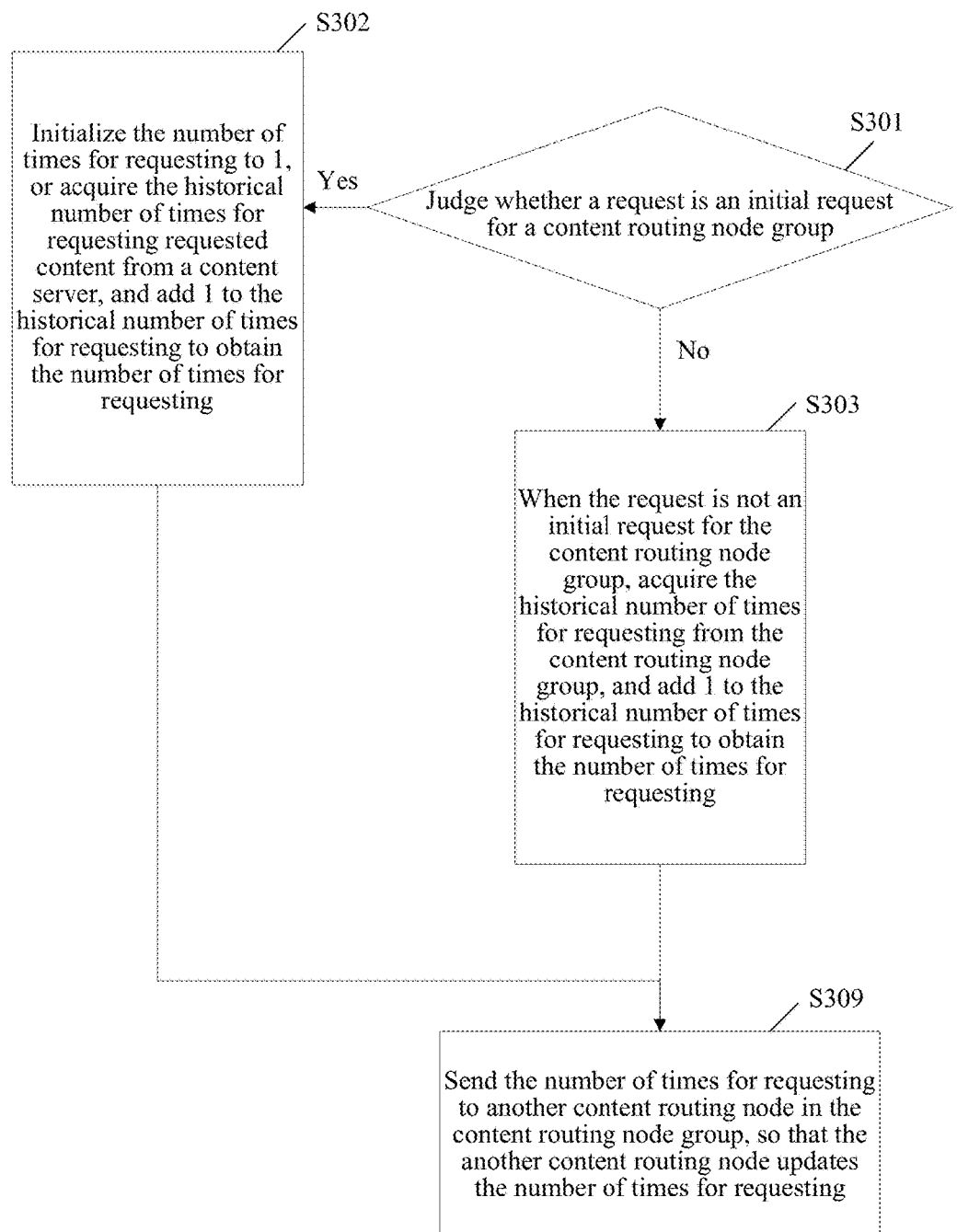
FIG. 3 is a schematic diagram of a specific implementation manner of step S103 according to an embodiment of the present invention.

FIG. 3 illustrates further details of step S103, and the step specifically includes:

S301: Judge whether a request is an initial request for a content routing node group, and if yes, execute S302; and if no, acquire the historical number of times for requesting, and add 1 to the historical number of times for requesting to obtain the number of times for requesting, that is, specifically, execute S303.

S302: Initialize the number of times for requesting to 1, or acquire the historical number of times for requesting requested content from a content server, and add 1 to the historical number of times for requesting to obtain the number of times for requesting, that is, execute S309.

S303: When the request is not an initial request for the content routing node group, acquire the historical number of times for requesting from the content routing node group, and add 1 to the historical number of times for requesting to obtain the number of times for requesting.

S309: Send the number of times for requesting to another content routing node in the content routing node group, so that the another content routing node updates the number of times for requesting.

It should be noted that, in S309, the number of times for requesting is sent to another content routing node in the content routing node group, so that the another content routing node updates the number of times for requesting, which is a further supplement after step S103 has been executed, and is not a detail of step S103.

Through this embodiment of the present invention, the content can be more conveniently accessed subsequently, so as to improve content acquiring efficiency and reduce a repeated transmission rate of a data packet.

In this embodiment of the present invention, it is selected that a content routing node initializes the number of times for requesting to 1. The historical number of times for requesting the content in the content server may not be considered, but reference is made to a statistical result of the content routing node group. Alternatively, it is selected that the historical number of times for requesting is acquired from the content server and then the existing historical number of times for requesting is considered in a statistical result as reference, and with the foregoing method, popularity of the content in a local area may be distinguished from global popularity of the content.

Figure 4:
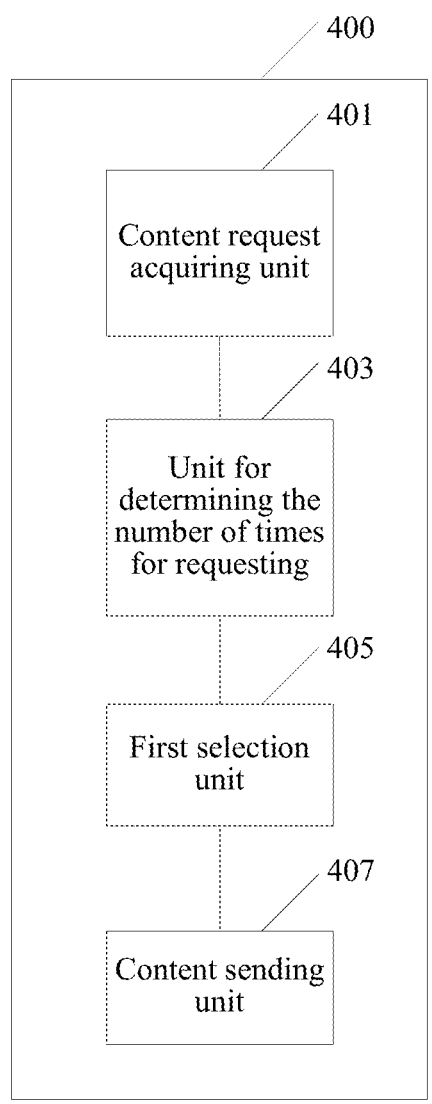
FIG. 4 is a schematic diagram of an apparatus embodiment according to an embodiment of the present invention.

FIG. 4 illustrates a content routing node 400, which includes:

a content request acquiring unit 401, configured to acquire a content request from a client; and a unit for determining the number of times for requesting 403, configured to determine the number of times for requesting content requested by the content request, where the content request is acquired by the content request acquiring unit; where, specifically, the unit for determining the number of times for requesting may include:

an initialization unit, configured to, when the request is an initial request for a content routing node group, initialize the number of times for requesting to 1; or when the request is an initial request for the content routing node group, acquire the historical number of times for requesting the requested content from a content server, and add 1 to the historical number of times for requesting to obtain the initialized number of times for requesting; and an adding unit, configured to, when the request is not an initial request for the content routing node group, acquire the historical number of times for requesting from the content routing node group, and add 1 to the historical number of times for requesting to obtain the number of times for requesting;

a first selection unit 405, configured to, when the number of times for requesting determined by the unit for determining the number of times for requesting is greater than a first preset threshold, acquire the content from a content routing node group in a content network according to the content request, where the content routing node group has a content storage function; and a content sending unit 407, configured to send the content acquired by the first selection unit to the client.

It should be noted that, the content routing node 400 may further include:

a synchronization unit, configured to send the number of times for requesting to another content routing node in the content routing node group, so that the another content routing node updates the number of times for requesting.

It should be noted that, each unit described in this embodiment may be a general-purpose integrated circuit, and may also be an application specific integrated circuit. For example, the adding unit may be an adder, the initialization unit may be a reset circuit, the content request acquiring unit 401 may be a data packet parsing circuit, and the unit for determining the number of times for requesting 403 may be a register accessing apparatus of a central processor.

It should be noted that, an executor of the step may be a general-purpose processor or a dedicated processor.

In this embodiment of the present invention, the number of times for requesting the content is determined according to the content request from the client. When the number of times for requesting is greater than the first preset threshold, the content is acquired from the content routing node group in the content network according to the content request, where the content routing node group has the content storage function; and when the number of times for requesting is less than or equal to the first preset threshold, the content request is sent to the content server that stores the content to acquire the content. Therefore, traffic distribution is well implemented, which can improve content acquiring efficiency and reduce a repeated transmission rate of a data packet.

Figure 5:
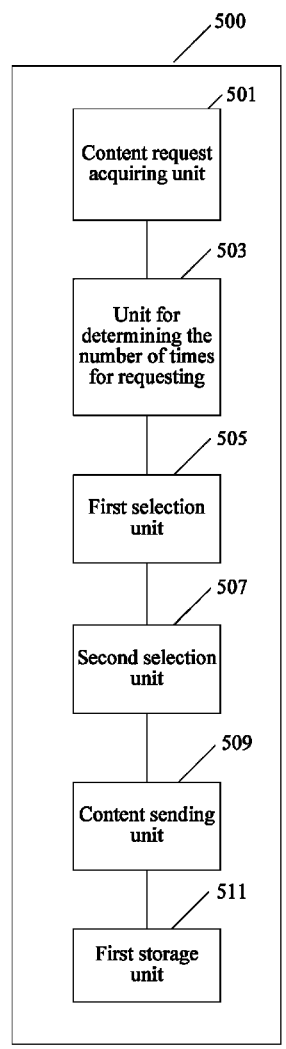
FIG. 5 is a schematic diagram of another apparatus embodiment according to an embodiment of the present invention.

FIG. 5 illustrates another embodiment of the present invention, and a content routing node 500 includes:

a content request acquiring unit 501, configured to acquire a content request from a client;

a unit for determining the number of times for requesting 503, configured to determine the number of times for requesting content requested by the content request, where the content request is acquired by the content request acquiring unit;

a first selection unit 505, configured to, when the number of times for requesting determined by the unit for determining the number of times for requesting is greater than a first preset threshold, acquire the content from a content routing node group in a content network according to the content request, where the content routing node group has a content storage function;

a second selection unit 507, configured to, when the number of times for requesting is less than or equal to the first preset threshold, send the content request to a content server that stores the content to acquire the content;

a content sending unit 509, configured to send the content acquired by the first selection unit to the client, and is further configured to send the content acquired by the second selection unit to the client; and a storage unit 511, configured to, when the number of times for requesting is equal to the first preset threshold, after the content is acquired from the content server, store the acquired content in the content routing node group; and the storage unit 511 may specifically include: a first storage unit, configured to, when local remaining storage capacity is greater than or equal to a storage space required for storing the content, locally store the content; a second storage unit, configured to, when the local remaining storage capacity is less than the storage space required for storing the content, determine, from the content routing node group, one content routing node whose current remaining storage capacity is greater than or equal to the storage space required for storing the content, and store the content in the content routing node, where when multiple other content routing nodes whose remaining storage capacity is greater than or equal to the storage space required for storing the content exist, one content routing node may be randomly selected for storing, or a routing node with the minimum number of hops from a local routing node may also be selected for storing.

Optionally, this embodiment may further include: a first deletion unit, configured to, when a storage time length of the content reaches a first preset life cycle and the number of times for requesting the content is less than a second preset threshold, delete the content; a first reset unit, configured to, when a storage time length reaches the first preset life cycle and the number of times for requesting the content is not less than the second preset threshold, reset the storage time length for recalculation; or a second deletion unit, configured to, when a storage time length of the content reaches a second preset life cycle and the number of times for requesting the content is less than a third preset threshold, delete the content; and a second reset unit, configured to, when the storage time length reaches the second preset life cycle and the number of times for requesting the content is not less than a third preset threshold, reset the storage time length and the number of times for requesting for recalculation.

It should be noted that, the storage unit in the step may be a general-purpose storage apparatus, and may also be a dedicated storage apparatus, for example, may be a RAM, SRAM, SDRAM, ROM, EPROM, EEPROM, or Flash.

In this embodiment of the present invention, the number of times for requesting the content is determined according to the content request from the client. When the number of times for requesting is greater than the first preset threshold, the content is acquired from the content routing node group in the content network according to the content request, where the content routing node group has the content storage function; when the number of times for requesting is less than or equal to the first preset threshold, the content request is sent to the content server that stores the content to acquire the content; and when the number of times for requesting is equal to the preset threshold, the content acquired from the content server that stores the content is locally stored, so that the content can be more conveniently accessed subsequently, thereby improving content acquiring efficiency and reducing a repeated transmission rate of a data packet.

Figure 6:
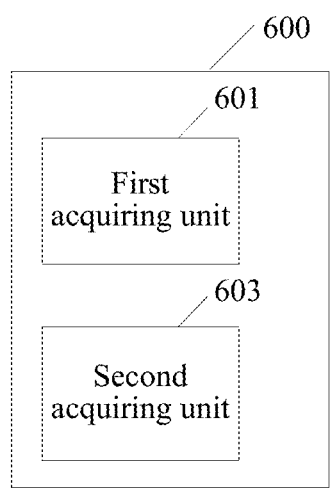
FIG. 6 illustrates a specific embodiment of a first selection unit 600 according to an embodiment of the present invention.

FIG. 6 illustrates further details of a first selection unit 600, and the unit includes:

a first acquiring unit 601, configured to, when content is locally found, acquire the content locally; and a second acquiring unit 603, configured to, when the content cannot be locally found, acquire the content from another content routing node in a content network.

Through this embodiment of the present invention, an apparatus for acquiring content among content routing nodes is implemented, and content and the number of times for requesting may be shared with each other in cooperation with other units, so as to improve content acquiring efficiency and reduce a repeated transmission rate of a data packet.

Figure 7:
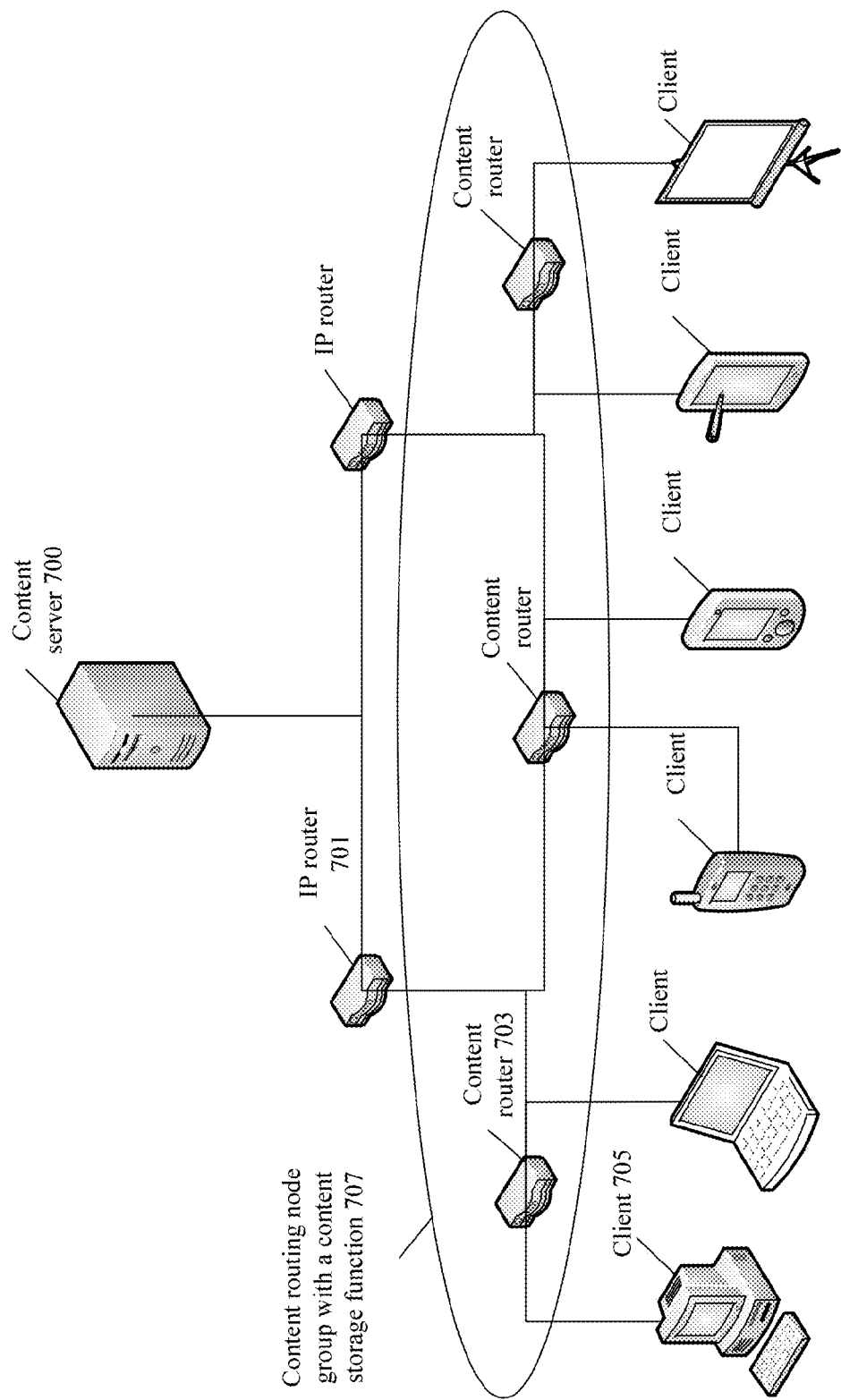
FIG. 7 is a schematic diagram of a system embodiment according to an embodiment of the present invention.

FIG. 7 illustrates a specific system embodiment according to an embodiment of the present invention. In the system embodiment, a content server is specifically a content server and a content routing node is specifically a content server, where the system includes:

a content server 700, configured to acquire a content request from a content routing node, and send requested content to the content routing node;

an IP router 701, which is an IP route maintenance unit and configured to implements a routing protocol of an IP network, and is responsible for maintaining an IP route of a router;

a content router 703, configured to acquire a content request from a client; determine the number of times for requesting requested content; when the number of times for requesting is greater than a first preset threshold, acquire the content from a content routing node group in a content network according to the content request, where the content routing node group has a content storage function; send the acquired content to the client; and is further configured to, when the number of times for requesting is less than the first preset threshold, send the content request to the content server to acquire the content, and send the acquired content to the client;

a client 705, configured to send a content request to the content routing node; where specifically, a user equipment installed with the client may be a desktop computer, a notebook computer, a smart phone, a personal digital assistant PDA (Personal Digital Assistant), a tablet computer, a network television, and so on; and a content routing node group 707, which is a content routing node group with a content storage function in a content network, where the content routing node is an edge router.

Specifically, the client 705 sends a content request to an edge content router 703, where a target address of the content request is the content server 700. The edge content router 703 acquires the content request from the client, determines the number of times for requesting the requested content; and when the number of times for requesting is greater than the first preset threshold, acquires the content from the content routing node group 707 in the content network according to the content request, where the content routing node group 707 has a content storage function. The acquiring the content from the content routing node group 707 in the content network, where the content routing node group 707 has a content storage function, further includes: locally acquiring or acquiring from another content router, specifically, locally searching and determining whether the content is stored, and if the content is locally found, acquiring the content locally; and if the content cannot be locally found, acquiring the content from another content routing node in the content network. When the number of times for requesting is less than or equal to the first preset threshold, after the content request is acquired, the content request is forwarded without processing; and after the content request is sent to the IP router 701, the IP router 701 sends the content request to a content server that stores the content to acquire the content. After the content is acquired by using the foregoing method, the acquired content is sent to the client 705.

This embodiment of the present invention provides a network system, and discloses a connection relationship among the content server, the edge content router, the IP router, and the client, which may improve content acquiring efficiency and reduce a repeated transmission rate of a data packet.

The network system may be a public network such as an operator's network or the Internet, or a private network such as an enterprise network (such as a bank, an electric power company, and a petroleum company).

In the foregoing embodiments, the preset threshold may be set during establishment of a network, or may also be set by maintenance personnel according to a requirement at any time after the network is established, and a specific setting manner may adopt any manner well known to persons skilled in the art.

Through the foregoing description of the embodiments, persons skilled in the art may clearly understand that the present invention may be accomplished by software plus necessary universal hardware, and definitely, may also be accomplished by hardware, but in many cases, the former is a preferred implementation manner. Based on this understanding, the technical solutions of the present invention or the part that makes contributions to the prior art may be substantially embodied in the form of a software product. The computer software product is stored in a readable storage medium, for example, a floppy disk, hard disk, or optical disk of a computer, and includes several instructions used to instruct a computer device (may be a personal computer, a server, or a network device, and so on) to perform the methods according to the embodiments of the present invention.

A sequence of the steps in the method embodiments may be adjusted according to an actual application requirement, and the steps may be combined into a new solution according to an actual application requirement. The units and modules in the foregoing apparatus embodiments may be divided or recombined according to an actual application requirement.

The foregoing descriptions are merely specific embodiments of the present invention, but are not intended to limit the protection scope of the present invention. Any variation or replacement easily figured out by persons skilled in the art within the technical scope disclosed in the present invention shall all fall within the protection scope of the present invention. Therefore, the protection scope of the present invention shall be subject to the protection scope of the claims, and equivalent variations made based on the claims of the present invention still fall within the scope of the present invention.

What is claimed is:

1. A method for acquiring content, comprising:
    acquiring a content request from a client;
    determining a number of times for requesting requested content; and
    when the number of times for requesting is greater than a first preset threshold, acquiring the content from a content routing node group in a content network according to the content request, wherein the content routing node group has a content storage function, and sending the acquired content to the client;
    the method further comprising:
    when the number of times for requesting is less than or equal to the first preset threshold, sending the content request to a content server that stores the content to acquire the content, and sending the acquired content to the client,
    wherein when the number of times for requesting is equal to the first preset threshold, the content request is sent to the content server that stores the content to acquire the content, and after the content is acquired, the method further comprises: storing the acquired content in the content routing node group;
    wherein after the storing the acquired content in the content routing node group, the method further comprises:
    when a storage time length of the content reaches a second preset life cycle and the number of times for requesting the content is less than a third preset threshold, deleting the content; and
    when the storage time length reaches the second preset life cycle and the number of times for requesting the content is not less than the third preset threshold, resetting the storage time length and the number of times for requesting for recalculation.

2. The method for acquiring content according to claim 1, wherein the storing the acquired content in the content routing node group comprises:
    when local remaining storage capacity is greater than or equal to a storage space required for storing the content, locally storing the content; and
    when the local remaining storage capacity is less than the storage space required for storing the content, determining, from the content routing node group, one content routing node whose current remaining storage capacity is greater than or equal to the storage space required for storing the content, and storing the content in the content routing node.

3. The method for acquiring content according to claim 1, wherein the determining the number of times for requesting the requested content comprises:
    judging, according to a request record in a content routing table, whether the request is an initial request for the content routing node group;
    when the request is an initial request for the content routing node group, initializing the number of times for requesting to 1, or acquiring the historical number of times for requesting the requested content from a content server, and adding 1 to the historical number of times for requesting to obtain the number of times for requesting; and
    when the request is not an initial request for the content routing node group, acquiring the historical number of times for requesting from the content routing node group, and adding 1 to the historical number of times for requesting to obtain the number of times for requesting.

4. The method for acquiring content according to claim 1, wherein after the determining the number of times for requesting the requested content, further comprising:
    sending the number of times for requesting to another content routing node in the content routing node group, so that the another content routing node updates the number of times for requesting.

5. The method for acquiring content according to claim 1, wherein after the storing the acquired content in the content routing node group, further comprising:
    acquiring routing information of a content routing node that stores the content;
    adding the routing information in a content routing table; and
    sending the routing information to another content routing node in the content routing node group, so that the another content routing node adds the routing information in the content routing table.

6. The method for acquiring content according to the claim 1, wherein when the number of times for requesting is greater than the first preset threshold, the acquiring the content from the content routing node group in the content network according to the content request, where the content routing node group has the content storage function, comprises:
    when it is determined, according to the content routing table, that the content is locally stored, locally acquiring the content; and
    when it is determined, according to the content routing table, that the content cannot be found locally, acquiring the content from another content routing node in the content routing node group.

7. A content routing node, comprising a processor and a memory device, the processor is configured to read instructs stored in the memory device to perform a method comprising:
    acquiring a content request from a client;
    determining a number of times for requesting requested content; and
    when the number of times for requesting is greater than a first preset threshold, acquiring the content from a content routing node group in a content network according to the content request, wherein the content routing node group has a content storage function, and sending the acquired content to the client;
    the method further comprising:
    when the number of times for requesting is less than or equal to the first preset threshold, sending the content request to a content server that stores the content to acquire the content, and sending the acquired content to the client, wherein when the number of times for requesting is equal to the first preset threshold, the content request is sent to the content server that stores the content to acquire the content, and after the content is acquired, the method further comprises: storing the acquired content in the content routing node group;

wherein after the storing the acquired content in the content routing node group, the method further comprises:

when a storage time length of the content reaches a second preset life cycle and the number of times for requesting the content is less than a third preset threshold, deleting the content; and when the storage time length reaches the second preset life cycle and the number of times for requesting the content is not less than the third preset threshold, resetting the storage time length and the number of times for requesting for recalculation.

8. The content routing node according to claim 7, the method performed by the processor further comprising:

when local remaining storage capacity is greater than or equal to a storage space required for storing the content, locally storing the content; and when the local remaining storage capacity is less than the storage space required for storing the content, determining, from the content routing node group, one content routing node whose current remaining storage capacity is greater than or equal to the storage space required for storing the content, and storing the content in the content routing node.

9. The content routing node according to claim 7, wherein the determining the number of times for requesting the requested content comprises:

judging, according to a request record in a content routing table, whether the request is an initial request for the content routing node group;

when the request is an initial request for the content routing node group, initializing the number of times for requesting to 1, or acquiring the historical number of times for requesting the requested content from a content server, and adding 1 to the historical number of times for requesting to obtain the number of times for requesting; and when the request is not an initial request for the content routing node group, acquiring the historical number of times for requesting from the content routing node group, and adding 1 to the historical number of times for requesting to obtain the number of times for requesting.

10. The content routing node according to claim 7, wherein after the determining the number of times for requesting the requested content, the method performed by the processor further comprising:

sending the number of times for requesting to another content routing node in the content routing node group, so that the another content routing node updates the number of times for requesting.

11. The content routing node according to claim 7, wherein after the storing the acquired content in the content routing node group, the method performed by the processor further comprising:

acquiring routing information of a content routing node that stores the content;

adding the routing information in a content routing table; and sending the routing information to another content routing node in the content routing node group, so that the another content routing node adds the routing information in the content routing table.

12. The content routing node according to the claim 7, wherein when the number of times for requesting is greater than the first preset threshold, the acquiring the content from the content routing node group in the content network according to the content request, where the content routing node group has the content storage function, comprises:

when it is determined, according to the content routing table, that the content is locally stored, locally acquiring the content; and when it is determined, according to the content routing table, that the content cannot be found locally, acquiring the content from another content routing node in the content routing node group.

13. A network system, comprising a client and a content routing node group, wherein the client is configured to send a content request to a content routing node; and a content routing node in the content routing node group is configured to acquire a content request from a client;

determine a number of times for requesting requested content; and when the number of times for requesting is greater than a first preset threshold, acquire the content from a content routing node group in a content network according to the content request, wherein the content routing node group has a content storage function, and send the acquired content to the client;

the content routing node is further configured to:

when the number of times for requesting is less than or equal to the first preset threshold, send the content request to a content server that stores the content to acquire the content, and send the acquired content to the client, wherein when the number of times for requesting is equal to the first preset threshold, the content request is sent to the content server that stores the content to acquire the content, and after the content is acquired, the content routing node is further configured to: store the acquired content in the content routing node group;

wherein after the storing the acquired content in the content routing node group, the content routing node is further configured to:

when a storage time length of the content reaches a second preset life cycle and the number of times for requesting the content is less than a third preset threshold, delete the content; and when the storage time length reaches the second preset life cycle and the number of times for requesting the content is not less than the third preset threshold, reset the storage time length and the number of times for requesting for recalculation.

14. The network system according to the claim 13, wherein the content routing node is an edge router.

* * * * *